United States Patent
Dubovik et al.

(10) Patent No.: US 8,458,328 B2
(45) Date of Patent: Jun. 4, 2013

(54) METHOD AND SYSTEM FOR DATA PACKET QUEUE RECOVERY

(75) Inventors: Gleb Dubovik, San Francisco, CA (US); Vadim Shtayura, San Francisco, CA (US); Nikolay Surin, San Francisco, CA (US)

(73) Assignee: Net Power and Light, Inc., San Francisco, CA (US)

( * ) Notice: Subject to any disclaimer, the term of this patent is extended or adjusted under 35 U.S.C. 154(b) by 313 days.

(21) Appl. No.: 12/938,264

(22) Filed: Nov. 2, 2010

(65) Prior Publication Data

US 2012/0110163 A1    May 3, 2012

(51) Int. Cl.
*G06F 15/173* (2006.01)

(52) U.S. Cl.
USPC ........... 709/224; 709/217; 709/219; 709/223; 709/226; 709/227; 709/229; 709/250

(58) Field of Classification Search
USPC ................. 709/217, 219, 223, 224, 226, 227, 709/229, 250
See application file for complete search history.

(56) References Cited

U.S. PATENT DOCUMENTS

| | | | |
|---|---|---|---|
| 7,345,996 B2 * | 3/2008 | Imiya et al. | 370/229 |
| RE43,668 E * | 9/2012 | Pogrebinsky | 370/229 |
| 2003/0231655 A1 | 12/2003 | Kelton et al. | |
| 2006/0242315 A1 | 10/2006 | Nichols | |
| 2008/0031146 A1 | 2/2008 | Kwak et al. | |
| 2010/0103822 A1 | 4/2010 | Montwill | |
| 2010/0191860 A1 * | 7/2010 | Krikorian et al. | 709/231 |
| 2010/0274920 A1 | 10/2010 | Kunii et al. | |
| 2012/0213077 A1 * | 8/2012 | Takeda et al. | 370/235 |

OTHER PUBLICATIONS

Co-pending U.S. Appl. No. 12/938,249 of Dubovik, G., et al., filed Nov. 2, 2010.
International Search Report mailed Apr. 18, 2012, of PCT Application No. PCT/US2011/056611, 3 pages.
Written Opinion mailed Apr. 18, 2012, of PCT Application No. PCT/US2011/056611, 6 pages.
International Search Report mailed Apr. 18, 2012, of PCT Application No. PCT/US2011/055615, 3 pages.
Written Opinion mailed Apr. 18, 2012, of PCT Application No. PCT/US2011/055616, 5 pages.
Non-Final Office Action mailed Oct. 1, 2012, of Co-Pending U.S. Appl. No. 12/938,249, filed Nov. 2, 2010.
Notice of Allowance mailed Mar. 15, 2013 in Co-Pending U.S. Appl. No. 12/938,249 of Dubovik, G., et al., filed Nov. 2, 2010.

\* cited by examiner

*Primary Examiner* — Wing F Chan
*Assistant Examiner* — Benjamin M Thieu
(74) *Attorney, Agent, or Firm* — Perkins Coie LLP

(57) ABSTRACT

Resource-aware dynamic bandwidth control uses information about current network state and receiver performance to avoid, minimize and/or recover from the effects of network spikes and data processing spikes. Linear models may be used to estimate a time required to process data packets in a data processing queue, and are thus useful to determine whether a data processing spike is occurring. When a data processing spike occurs, an alarm may be sent from a client to a server notifying the server that the client must drop packets. In response, the server can encode and transmit an independent packet suitable for replacing the queued data packets which can then be dropped by the client and the independent packet present to the processor instead.

12 Claims, 5 Drawing Sheets

METHOD AND SYSTEM FOR DATA PACKET QUEUE RECOVERY

FIELD OF INVENTION

The present invention relates to network communications and more specifically to recovery of a data packet queue from data processing spikes in response to current network state and receiver processing performance.

DESCRIPTION OF RELATED ART

On a variety of devices, the available processing power can be extremely limited, and can dramatically vary over time. For example, an application executing on a portable computer such as an iPad, is only provided limited processor power as the operating system and other applications tend to monopolize. The application here has no control over prioritizing the efforts of the processor, and thus may run into untenable data processing spikes, where the queued up data from the application can simply not accomplish the requested workload in the necessary timeframe.

The data processing latency problems are only exacerbated when the application is executing on a remote server and streaming the data packets to the client device. In such cases, network latency and data processing latency both contribute to the inability of the client to perform the desired workload.

SUMMARY OF THE INVENTION

The present teaching contemplates a variety of methods, systems and paradigms for providing resource-aware dynamic bandwidth control. Resource-aware dynamic bandwidth control is applicable to a pair of executable components instantiated on different network nodes (e.g. a client-server pair, or a sender node and a receiver node), where a first component sends data and a second component receives and processes the received data. The computational resources expended at the client processing the received data are assumed to correspond with an input bandwidth at the receiver. Through a variety of mechanisms, the server may control output bandwidth.

Resource-aware dynamic bandwidth control uses information about current network state and receiver performance to avoid, minimize and/or recover from the effects of network spikes and data processing spikes. Network spikes may imply packet loss and dramatic growth of the data delivery latency caused by network connection overloading. Data processing spikes correspond to the processing state of the receiver, i.e., incoming data cannot be processed at the receiver because the computational resources have been exhausted. Linear models may be used to estimate a time required to process data packets in a data processing queue, and are thus useful to determine whether a data processing spike is occurring.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION OF THE INVENTION

The present teaching provides a variety of methods, systems and paradigms for providing resource-aware dynamic bandwidth control. Resource-aware dynamic bandwidth control is applicable to a pair of executable components instantiated on different network nodes (e.g. a client-server pair, or a sender node and a receiver node), where a first component sends data and a second component receives and processes the received data. The computational resources expended at the client processing the received data are assumed to correspond with an input bandwidth at the receiver. Through a variety of mechanisms, the server may control output bandwidth.

Resource-aware dynamic bandwidth control uses information about current network state and receiver performance to avoid, minimize and/or recover from the effects of network spikes and data processing spikes. Network spikes may imply packet loss and dramatic growth of the data delivery latency caused by network connection overloading. Data processing spikes correspond to the processing state of the receiver, i.e., incoming data cannot be processed at the receiver because the computational resources have been exhausted.

Figure 1:
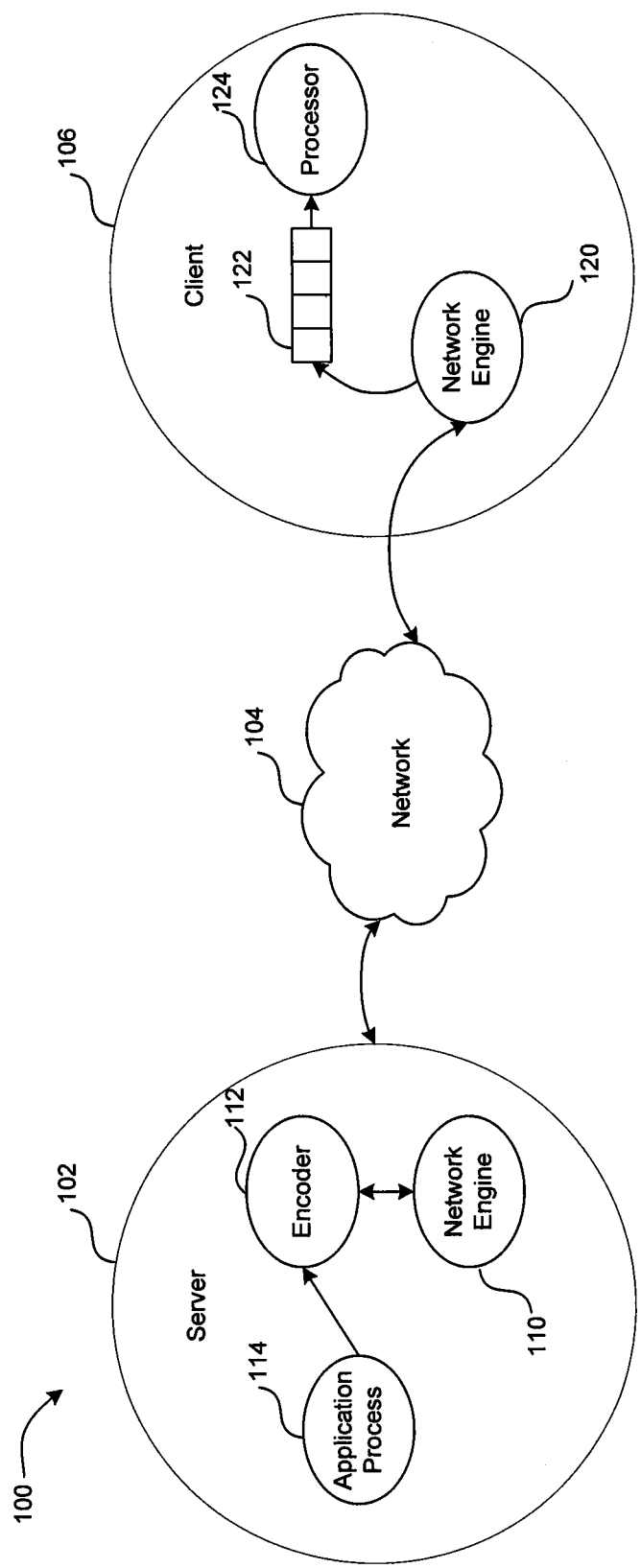
FIG. 1 illustrates a block diagram of a server client system providing one example of a resource-aware dynamic bandwidth control system.

FIG. 1 illustrates a system 100 according to an embodiment of the present teaching. System 100 includes a server 102 coupled bi-directionally via a network 104 to a client 106. It is helpful to consider server 102 and the client 106 as a transmitting network node and a receiving network node, respectively. The server 102 transmits data to the client 104, and is operable to control an output bandwidth for transmissions to the client 104. The data may represent a workload or task to be performed by the client. For example, the data stream may be encoded video which the client decodes, renders and displays. An input bandwidth of the client 104 is related to the computational resources needed to process data received from the server 102.

The server 102 includes a network engine 110, a data encoder 112, and an application 114. The network engine 110 and the encoder 112 operate on a data stream generated by the application 114 to create and transmit an encoded packetized data stream. Data encoder 112 is any suitable encoder such as a video or audio encoder. Another suitable data encoder is a sentio encoder described in more detail in Vonog et al's U.S. patent application No. 61/373,236, entitled EXPERIENCE OR SENTIO CODECS, AND METHOD AND SYSTEMS FOR IMPROVING QOE AND ENCODING BASED ON QOE EXPERIENCES, incorporated herein by reference for all purposes. The network engine 110 monitors state information of network 112, and is responsive to signals such as a data processing spike alert received from the client 106, to dynamically adjust an output bandwidth for the network transmission to client 106.

For example, network latency can be measured and/or estimated, and the bitrate raised or lowered accordingly. Likewise, client processing latency can be monitored, and the bitrate raised or lowered accordingly. In the case of the data stream being video, an unacceptable client processing latency could lead to a lowering of the output bandwidth by decreasing the quality of the encoded video output for transmission.

The network engine 110 is operable of generating at least two packet types for transmission: I and N. I-packets can be processed at the client 106 independently, i.e., the I-packet does not depend on any other packets for processing at the client 106. In contrast, to process an N-packet, the client 106 must first successfully process the last received I-packet and any N-packets received subsequent to the last I-packet. The "normal" packet prepared for delivery is the N-packet. An I-packet is prepared by the server 102 in specific response to receipt of an alert message from the client 106. The client 106 handles the I-packet as described below.

The client 106 includes a network engine 120, a data packet queue 122, and a processor 124. The network engine 120 receives the data stream from server 102, typically in the form of data packets. When the received data exceeds the processing capability available to the network engine 120, the network engine 120 must queue up the received data packets in the data packet queue 122 for presentation to the processor 124. This queuing up process increases data processing latency, which in extreme cases ("spikes") effects the desired operation. When the network engine 120 detects the beginning of a processing spike, the network engine 120 transmits an alarm signal back to the server 102 indicating that the client 106 needs to drop packets.

In response to the alarm signal, the server 102 generates and transmits an I-packet to the client 102. Upon receiving the I-packet, the network engine 120 drops all related packets pending in the queue 122 and presents the I-packet to the processor 124 for execution. Once the I-packet is processed, the client 106 can begin processing normal N-packets. Additionally, as mentioned above, the server 102 can also lower the output bandwidth to minimize alarm signals.

It will be appreciated that a variety of different algorithms for dynamic bandwidth control may be implemented. In a first embodiment, the server 102 may respond to an alarm signal by sending an I-packet and then lowering output bandwidth. The output bandwidth may then remain at the lowered state indefinitely, or reduced as subsequent alerts are received. Alternatively, the server 102 may incrementally and/or periodically increase output bandwidth until another alarm signal is received. Or, the client 106 may continuously send information to the server 104 related to available input bandwidth, and the server 106 may constantly readjust the output bandwidth accordingly.

The server 102 and the client 106 can each be any suitable computer system including a workstation, a personal computer, a netbook, or a system that is distributed across a plurality of computers at a data center or geographically disparately located, etc. The network 104 could take any suitable form including a local area network (LAN), a wireless network such as a WLAN, an intranet, or the Internet backbone. The processor 124 can include any combination of a graphics processing unit (GPU), a central processing unit (CPU), and other components necessary for processing data packets. The processor 124 can even be viewed as an abstract entity, and thus could include various distributed components not necessary existing locally with the network engine 120 and packet queue 122.

Figure 2:
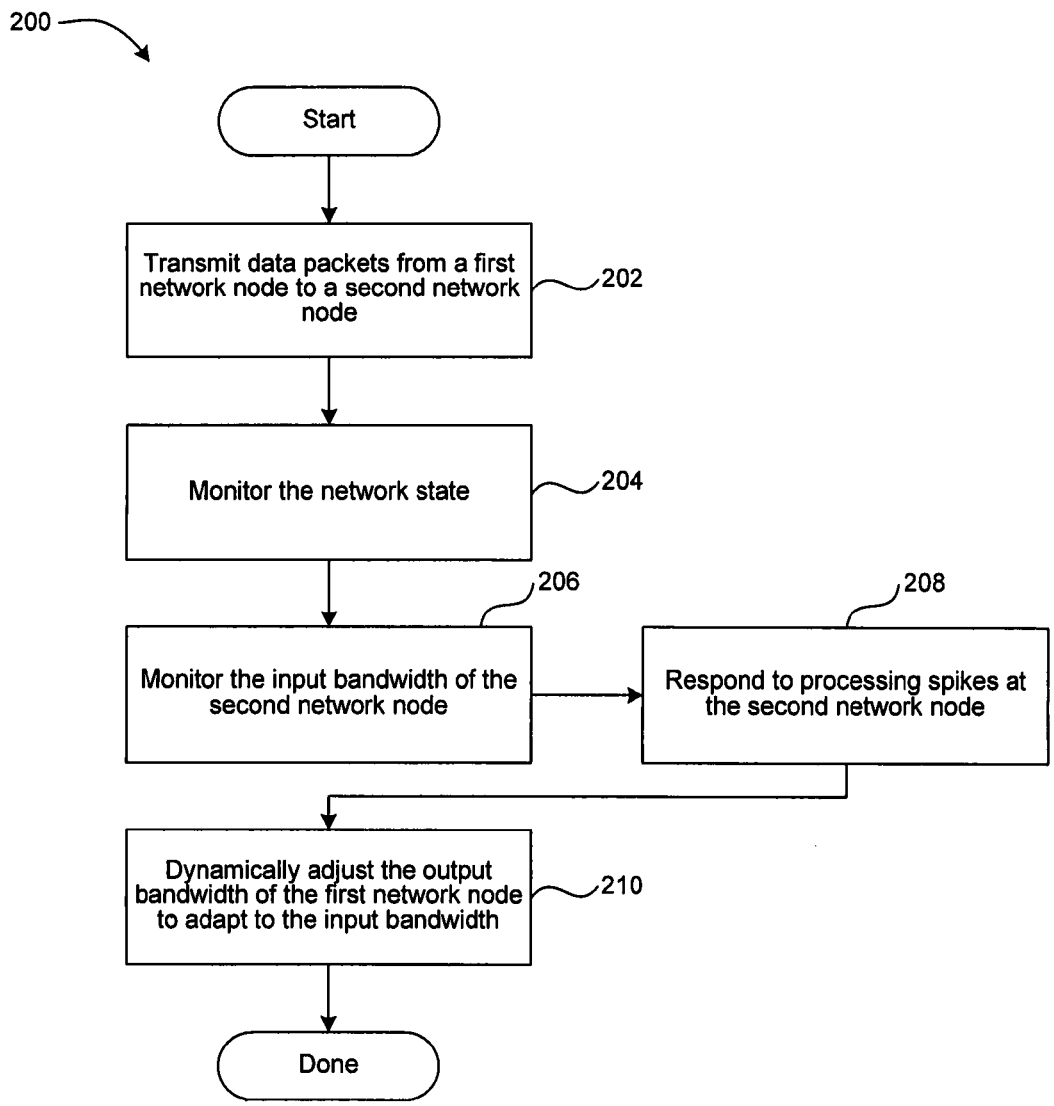
FIG. 2 is a flowchart showing one example method for providing resource-aware dynamic bandwidth control.

FIG. 2 illustrates a flow chart for a method 200 for resource-aware dynamic bandwidth control including data processing spike response. A step 202 transmits data packets from a first network node to a second network node. The data packets may be generated by a software application executing on the first network node, or may arise from another source local or remote. In some embodiments, the data packets are sent via a low-latency transmission protocol. One suitable low-latency transmission protocol is described in Vonog et al's U.S. patent application Ser. No. 12/569,876, filed Sep. 29, 2009, entitled METHOD AND SYSTEM FOR LOW-LATENCY TRANSFER PROTOCOL, and incorporated herein by reference. Another suitable data transmission operation is described below with reference to FIG. 3.

A step 204 of FIG. 2 monitors a state of the transmission network. In particular, step 204 typically estimates network transmission latency. Other network characteristics such as jitter, bandwidth, and packet loss can be measured. As those skilled in the art will appreciate, there are a variety of suitable techniques for measuring these characteristics.

A step 206 of FIG. 2 monitors an input bandwidth of the second network node. The input bandwidth corresponds to available processing horsepower, which, e.g., is associated with the time required for the second network node to process a data packet and/or a set of data packets held in a queue waiting for processor cycles. In one embodiment, the second network node in step 206 attempts to determine whether a processing spike is beginning or in process. A processing spike correlates to packet or packet queue processing time exceeding a certain defined threshold for a predefined period. One suitable method for determining whether a spike is happening is described in more detail below with reference to FIG. 4.

Other types of data processing patterns beyond spikes may have other meanings or require other action, and so the input bandwidth monitoring may look for such patterns as well. For example, it may be useful to monitor for the end of a spike, or excess processing capacity, and report this information back to the first network node. The definition of a spike may even depend on the nature of the workload. However, data processing spikes as described herein are presumably detrimental to many types of workloads.

A step 208 of FIG. 2 responds to a processing spike occurring at the second network node. In general, the second network node must drop packets, notify the first network node, and somehow satisfy the task or workload associated with the received data. This was described above in more detail, and one example method for accomplishing this is described below with reference to FIG. 5. Step 208 further includes notifying the first network node of the processing spike, typically by sending back an alarm signal. As previously mentioned, in one embodiment the alarm just indicates that a spike is beginning. However, more sophisticated information such as packet data processing time can be included in the alarm. Packet data processing time could be used by the first network node to adjust the output bandwidth, or in forming the I-packet.

A step 210 of FIG. 2 dynamically adjusts the output bandwidth of the first network node to adapt to the available input bandwidth at the first network node. Typically this includes decreasing the bitrate by taking some action such as decreasing video quality thereby decreasing bandwidth requirements.

Figure 3:
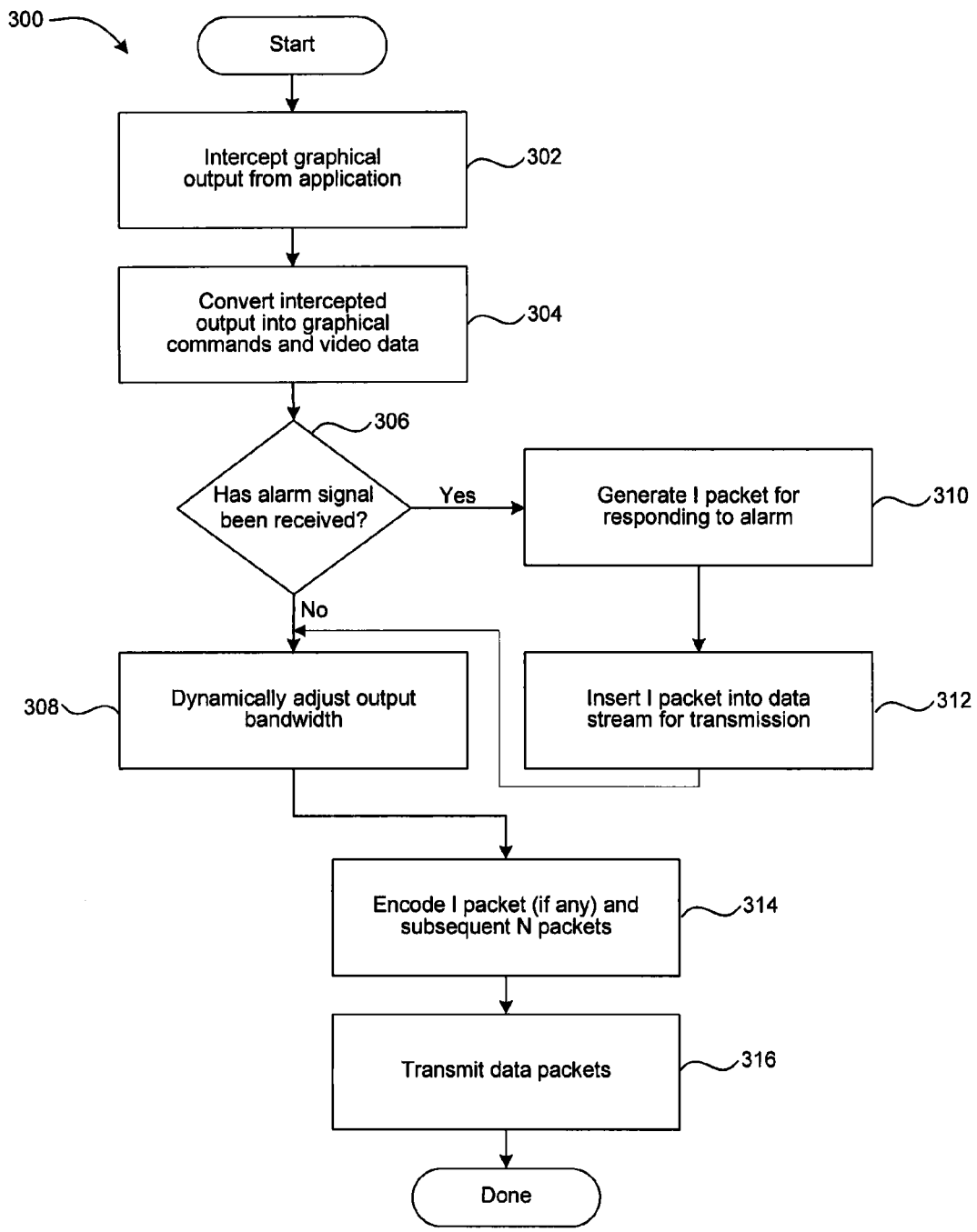
FIG. 3 is a flowchart showing one example for transmitting data according to a low-latency protocol.

FIG. 3 illustrates a method 300 for low-latency transmission of graphical image data packets. The teaching of the present invention is well suited to such a workload, as lowering output bandwidth for this type of workload and data processing spike estimation are doable. A step 302 intercepts a graphical output data stream from an application or other source. A step 304 converts the interrupted graphical output into graphical commands and video data. As described in Vonog et al's application Ser. No. 12/569,876 referenced above, a suitable encoder can use different algorithms to encode graphical commands and video data, decreasing bandwidth requirements for transmitting a graphical image workload.

A step 306 of FIG. 3 determines whether an alarm signal has been received. If no alarm signal has been received, control passes to a step 308 where output bandwidth can be dynamically adjusted. As previously mentioned, a variety of suitable strategies for adjusting output bandwidth are available. In one embodiment, output bandwidth is only lowered, and only in response to receipt of an alarm signal. However other embodiments contemplate increasing output bandwidth when it is determined that the input bandwidth of the second network node can handle an increase.

If in step 306 the alarm signal has been received, control passes to a step 310 where an I-packet is generated. As described above, an I-packet can be processed independently and replaces earlier transmitted normal, or N-packets, enabling the second network node to drop unprocessed data packets. A step 312 inserts the generated I-packet into the data stream for encoding, and control is passed to step 308 where the output bandwidth is adjusted as necessary. A step 314 encodes the available data packets, whether an I-packet or N-packets, according to the output bandwidth. A step 316 transmits the data to second network node via the network.

Figure 4:
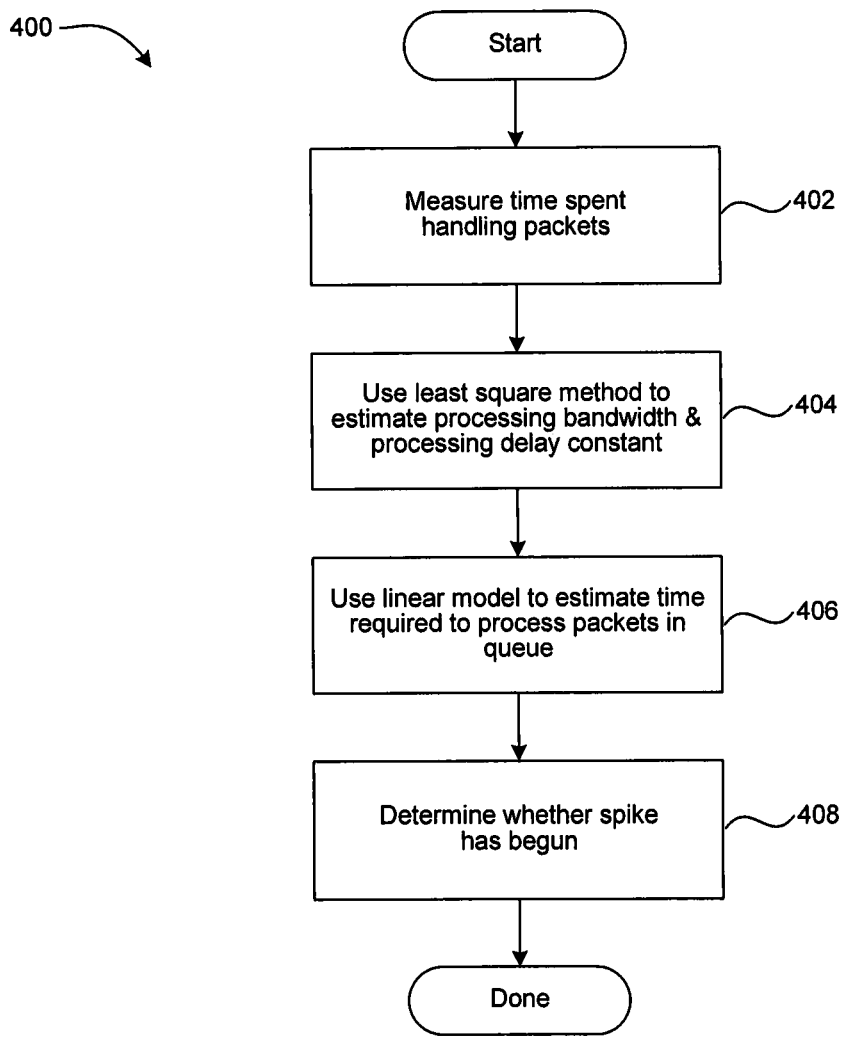
FIG. 4 is a flowchart showing one suitable method for monitoring input bandwidth of a client or receiving network node.

FIG. 4 illustrates a method 400 for data processing spike detection. In order to generate a useful response to a data processing spike, such as an alarm and/or I-packet generation, the presence of a data processing spike should be determined as soon as possible. In one embodiment, if packet processing time exceeds a predefined threshold for a predefined period, it is determined that a processing spike is occurring.

In the method 400 of FIG. 4, a linear model is used to estimate packet processing time. This linear model assumes processing time is proportional to packet size, and includes a factor for available processing horsepower. In practice, the inventors have determined that this linear model provides a useful estimate, in particular for data packets such as graphical image where processing time does generally correspond with packet size. The linear model estimates packet processing time as follows:

$$T=C+S*B$$

where T is processing time, C is a constant processing delay independent of packet size, B is processing bandwidth, and S is packet size. Step 402 directly measures time spent by the processor at the receiving network node processing data packets. Step 404 uses a least square algorithm to estimate the processing bandwidth B and the processing delay constant C. Step 406 uses the parameters estimated in step 404 in the dynamic linear model to estimate the time required to process packets in the queue. Step 408 determines whether a processing spike has begun, e.g., has packet processing time exceeded a predefined threshold for a predefined period. To be more specific, one possible implementation would be to determine whether it takes longer than 200 ms to process a packet, and will this threshold been exceeded for more than 200 ms.

The thresholds and limits here tend to depend on the type of workload indicated by the data being processed. For example, tasks related to a user interface must have processing delays ideally not detectable via human senses, or at least not distracting to a user. Likewise, the linear model used here to estimate packet processing time was developed by the inventors to specifically address a workload including image, video and audio information. It is contemplated that for other types of workloads, different models may be better suited for estimating processing time.

Figure 5:
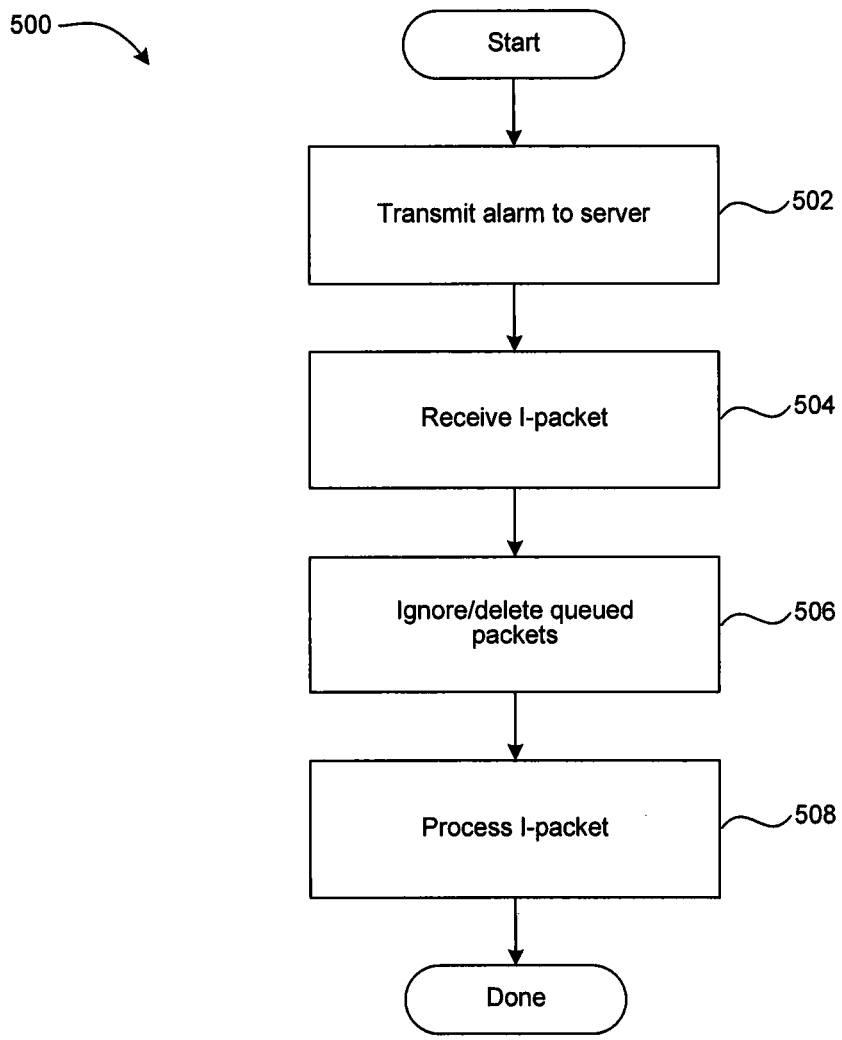
FIG. 5 is a flow chart illustrating a suitable method for responding to a processing spike occurring at a client or receiving network node.

FIG. 5 illustrates a method 500 for responding to detection of a data processing spike at a client. In a step 502 the client transmits an alarm signal to a server transmitting the workload to the client. In some embodiments, the alarm signal simply indicates to the server that the client is experiencing a data processing spike and thus must drop packets. Alternatively, the alarm signal could include more detailed information regarding the processing spike. In a step 504, the client receives an I-packet from the server. As described above, an I-packet can be processed independent of other packets, and provides a new, less processor intensive, workload used to replace the workload indicated by earlier packets. Thus, an I-packet can be inserted anywhere into the data stream and enables the client to recover from a data processing spike. In a step 506, the client drops any queued data packets, allowing the client to exit the data processing spike. In a step 508, the client presents the I-packet to the processor. Once the I-packet has been processed, the client can begin processing normal packets again.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

We claim:

1. A computer implemented method comprising:
   transmitting a specific data stream across a network from a first network node to a second network node according to a given output bandwidth, the specific data stream including normal packets (N-packets) which are processed sequentially;
   monitoring for an alarm signal from the second network node indicating a processing spike of the specific data stream, the alarm signal includes indication of an input bandwidth of the second network node;
   dynamically adjusting the output bandwidth in response to receiving the alarm signal with reference to the input bandwidth; and
   in response to receiving the alarm signal, transmitting an independent packet (I-packet) to the second network node, wherein the I-packet is a network packet processed independently of other packets at the second network node;
   wherein transmitting the I-packet is for replacing remaining packets from a processing queue of the second network node and for enabling the second network node to accomplish a processing task; and
   wherein dynamically adjusting the output bandwidth includes lowering the output bandwidth in order to decrease a processing queue latency of the processing queue.

2. A computer implemented method as recited in claim 1, wherein transmitting the specific data stream across the network is performed according to a low-latency protocol.

3. A computer implemented method as recited in claim 1, further including monitoring a network state of the network, wherein dynamically adjusting the output bandwidth takes into consideration the network state.

4. A computer implemented method as recited in claim 3, wherein monitoring the network state includes determining a latency characteristic of the network.

5. A computer implemented method as recited in claim 4, wherein determining the latency characteristic of the network is accomplished by transmitting test packets.

6. A computer implemented method as recited in claim 1, wherein the input bandwidth of the second network node is associated with a data processing rate of the second network node, the data processing rate of the second network node associated with processing the specific data stream received at the second network node.

7. A computer implemented method as recited in claim 1, wherein the output bandwidth corresponds to a specific bitrate.

8. A computer implemented method as recited in claim 7, wherein dynamically adjusting the output bandwidth includes raising or lowering the specific bitrate.

9. A computer implemented method as recited in claim 8, wherein lowering the specific bitrate includes increasing a compression factor when encoding the specific data stream.

10. A computer implemented method comprising:
  receiving, from a server, a data stream including normal data packets (N-packets) at a client device;
  queuing the N-packets in a data processing queue for processing at the client device;
  estimating data packet processing latency of the N-packets;
  when the data packet processing latency corresponds to a data processing latency spike, sending an alarm signal from the client device to the server; and
  dropping a remaining portion of the N-packets in the data processing queue in response to receiving an independent network packet (I-packet) from the server;
  wherein the I-packet is independently processed at the client device asynchronous to previously received network packets;
  wherein estimating the data packet processing latency includes estimating data packet processing time for the queued N-packets based on a linear model;
  wherein the data packet processing time is computed as: $T = C + S*B$, where T is the estimated data packet processing time, C is a constant processing delay time independent of data packet size, B is a processing bandwidth, and S is a measure of packet size.

11. A processor-based server system for providing resource-aware dynamic bandwidth control comprising:
  a non-transitory storage medium storing a server network module, the server network module operable when executed by a processor;
  wherein, the server network module is operable to:
    transmit a specific data stream across a network to a client network node according to a given output bandwidth, the specific data stream including normal packets (N-packets) which are processed sequentially;
    monitor for an alarm signal from the client network node indicating a processing spike of the specific data stream, the alarm signal includes indication of an input bandwidth of the client node;
    dynamically adjust the output bandwidth in response to receiving the alarm signal with reference to the input bandwidth;
    in response to receiving the alarm signal, transmit an independent packet (I-packet) to the client network node, wherein the I-packet is a network packet processed independently of other packets at the client network node;
  wherein the processing spike corresponds to data processing latency at the client network node as estimated based on a linear model by adding a constant processing delay time independent of data packet size with a processing bandwidth multiplied by a measure of packet size.

12. A network management processor-based system comprising:
  a network engine stored on a non-transitory storage medium, the network engine operable when executed by a processor;
  wherein, the network engine is operable to:
    receive, from a server, a data stream including normal data packets (N-packets);
    queue the N-packets in a data processing queue for processing;
    estimate data packet processing latency of the N-packets;
    when the data packet processing latency corresponds to a data processing latency spike, send an alarm signal to the server; and
    drop a remaining portion of the N-packets in the data processing queue in response to receiving an independent network packet (I-packet) from the server;
  wherein the I-packet is independently processed asynchronous to previously received network packets
  wherein when the data packet spiked is detected, a state information of the data processing queue including the alarm signal is sent to the server, the alarm signal indicating that the network engine must drop packets due to the data processing spike;
  wherein the network engine is responsive to the I-packet to drop all packets in the data packet queue and present the I-packet to the processor, wherein the I-packet corresponds to a workload in the dropped packets; and
  wherein data packet processing latency is computed as: $T = C + S*B$, where T is the estimated data packet processing latency, C is a constant processing delay time independent of data packet size, B is a processing bandwidth, and S is a measure of packet size.

* * * * *